United States Patent [19]

Kobayashi et al.

[11] 4,147,577
[45] Apr. 3, 1979

[54] PNEUMATIC TIRE BUILDING METHOD AND APPARATUS

[75] Inventors: Norio Kobayashi; Yoshihiro Fukamachi, both of Kodaira, Japan

[73] Assignee: Bridgestone Tire Company Limited, Tokyo, Japan

[21] Appl. No.: 817,850

[22] Filed: Jul. 21, 1977

[30] Foreign Application Priority Data

Jul. 23, 1976 [JP] Japan .................. 51/87851

[51] Int. Cl.² ............................. B29H 17/37
[52] U.S. Cl. ..................... 156/123 R; 156/130; 156/259; 156/397; 264/146; 264/175; 425/367; 425/DIG. 235
[58] Field of Search .............. 156/123, 128 R, 130, 156/133, 242, 259, 394, 397, 405, 406; 264/146, 175; 425/363, 365, 367, 375, DIG. 235

[56] References Cited

U.S. PATENT DOCUMENTS

| | | | |
|---|---|---|---|
| 1,544,305 | 6/1925 | Fisher | 425/363 |
| 1,603,813 | 10/1926 | Stein | 425/363 |
| 2,625,709 | 1/1953 | Schairer | 425/363 |
| 3,170,499 | 2/1965 | Deist | 425/DIG. 235 |
| 3,223,573 | 12/1965 | Deist | 156/130 |
| 3,270,107 | 8/1966 | Bailey et al. | 264/175 |
| 3,339,228 | 9/1967 | Seanor et al. | 425/363 |
| 3,570,054 | 3/1971 | Seanor et al. | 425/367 |
| 3,580,781 | 5/1971 | Hollis et al. | 156/397 |
| 3,607,557 | 9/1971 | Casey et al. | 156/405 |
| 4,043,731 | 8/1977 | Kratzmann | 425/DIG. 235 |

*Primary Examiner*—John E. Kittle
*Attorney, Agent, or Firm*—Cushman, Darby & Cushman

[57] ABSTRACT

Herein disclosed are pneumatic tire building method and apparatus for applying a continuous rubber strip on a tire carcass preliminarily wrapped around a tire building drum to produce a pneumatic tire having a tread rubber portion and one or more side rubber portions both of which or any one of which consists of different rubber materials. A pair of calender rollers are positioned in opposing and spaced relation with each other and each having a rotational axis parallel to that of said tire building drum, and at least one comparment plate is vertically disposed on and between said calender rollers in perpendicular relation with said rotational axes of said calender rollers and having a lower edge contoured in sliding contact with said calender rollers. At least one separator relatively movably mounted on said compartment plate and having a lower edge contoured in sliding contact with said calender rollers to separate and joint said calendered rubber materials. The separator is vertically moved to its lowest and uppermost positions so that different rubber materials partitioned on the calender rollers by the compartment plate are separately and jointingly calendered. The separated rubber material is removed while the remaining rubber material is applied on the tire carcass preliminarily wrapped around the tire building drum to build a desired contour of tread and side portions.

3 Claims, 13 Drawing Figures

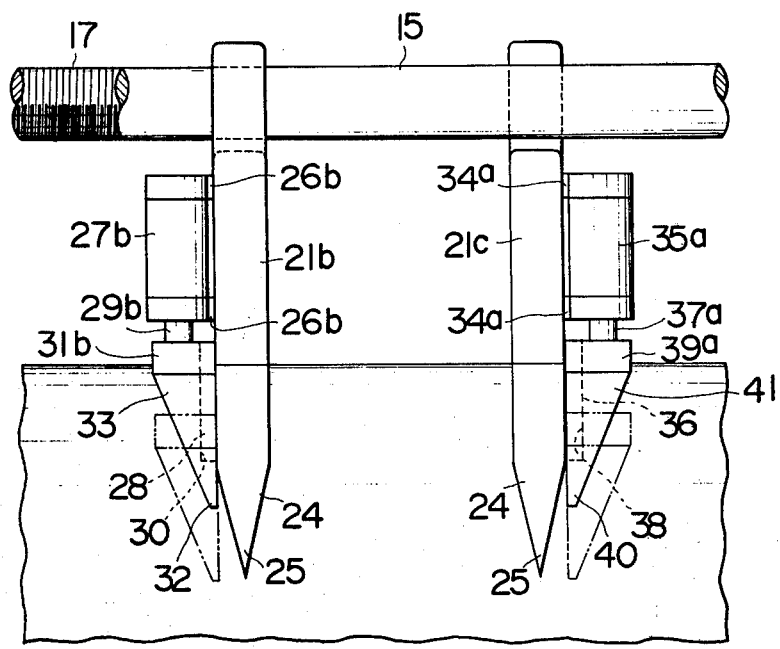
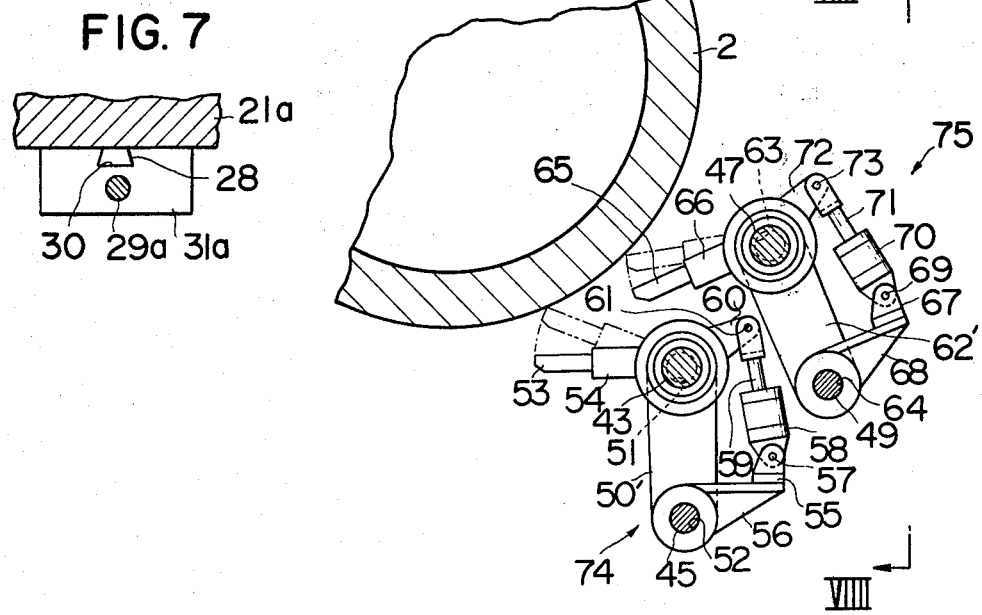

PNEUMATIC TIRE BUILDING METHOD AND APPARATUS

This invention relates to the art for production of pneumatic tires and more particularly to pneumatic tire building method and apparatus for applying a continuous rubber strip on a tire carcass preliminarily wrapped around a tire building drum to produce a pneumatic tire having a tread rubber portion and one or more side rubber portions both of which or any one of which consists of different rubber materials.

It is well known in the art to apply a continuous rubber strip on a tire carcass preliminarily wrapped around a tire building drum to produce a pneumatic tire having a tread rubber portion and one or more side rubber portions both of which or any one of which consists of identical rubber material. However, it has recently been required for the characteristics of the pneumatic tire to constitute its tread rubber portion and/or side rubber portions which are partially composed of different rubber materials. Conventional building method and apparatus entailed tremendous troubles to produce such a pneumatic tire and any satisfactory proposal has not been found. For example, there has been proposed a method wherein a rubber strip composed of a rubber material to be built into the side rubber portion is firstly applied on the tire carcass preliminarily wrapped around the tire building drum and secondly a rubber strip composed of a rubber material to be built into the tread rubber portion is applied side-by-side with the rubber strip just applied. Otherwise, the rubber materials for the tread and side rubber portions were extruded to be built on the tire building drum by a commonly used extruding machine. These conventional operations were extremely laborious and time-consuming especially for production of large size tires. Although it may be considered that continuous rubber strips each composed of a single rubber material are one by one applied on the tire carcass on the tire building drum, there may occur gaps between the adjacent rubber strips which cause entry of air in the tire, thereby decreasing quality of a finished tire.

It is therefore an object of the present invention to provide pneumatic tire building method and apparatus which is not laborious and time-consuming.

It is another object of the present invention to provide pneumatic tire building method and apparatus which can produce a finished tire with high quality.

In order to accomplish the foregoing objects, the present invention provides a pneumatic tire building method of applying a continuous rubber strip on a tire carcass preliminarily wrapped around a tire building drum to produce a pneumatic tire having a tread rubber portion and one or more side rubber portions both of which or any one of which consists of different rubber materials, comprising the steps: preparing a pair of calender rollers positioned in opposing and spaced relation with each other and each having a rotational axis parallel to that of the tire building drum, and at least one compartment plate vertically disposed on and between the calender rollers in perpendicular relation with the rotational axes of the calender rollers and having a lower edge contoured in sliding contact with the calender rollers; jointingly calendering two different rubber materials partitioned by the compartment plate into a continuous rubber strip; progressively varying widths of the calendered rubber materials constituting the continuous rubber strip and applying the calendered rubber materials on the tire carcass to build a desired contour of tread and side portions; separately calendering two different rubber materials to be removed from the continuous rubber strip so as to apply only one of the calendered rubber materials on the just applied rubber strip; cutting the separately calendered rubber material at its separated position and removing the same; and applying only the remaining calendered material on the just applied rubber strip to build the desired contour of tread and side portions. In addition, the present invention provides a pneumatic tire building apparatus comprising: a tire building drum receiving and holding an endless tire carcass; a calendering mechanism positioned in spaced relation with the tire building drum, the calendering mechanism including a pair of calender rollers positioned in opposing and spaced relation with each other and each having a rotational axis parallel to that of the tire building drum; at least one compartment plate vertically disposed on and between the calender rollers in perpendicular relation with the rotational axes of the calender rollers and having a lower edge contoured in sliding contact with the calender rollers to partition different unvulcanized rubber materials on the calender rollers and to enable a continuous rubber strip consisting of the different rubber material to be calendered by the calender rollers, said compartment plate movable along the rotational axes of said calender rollers to vary desired widths of the calendered rubber materials, at least one separator relatively movably mounted on the compartment plate and having a lower edge contoured in sliding contact with the calender rollers to separate and joint said calendered rubber materials, driving means drivably connected with the calender rollers for rotation therefor, compartment moving means for moving the compartment plate along the rotational axes of the calender rollers, and separator moving means for moving the separator to separate and joint the calendered rubber materials; and a cutting mechanism disposed between the tire building drum and the calendering mechanism to be movable along the rotational axes of the calender rollers for cutting the calendered rubber materials to have their desired widths.

The above and other objects, features and advantages of the present invention will become clear from the following particular description of the invention and the appended claims, taken in conjunction with the accompanying drawings which show by way of example a preferred embodiment of the present invention.

In the accompanying drawings:

FIG. 6 is a partly cross-sectioned view as seen from the lines VI—VI in FIG. 5;

FIG. 7 is a partly cross-sectioned view as seen from the line VII—VII in FIG. 5;

FIG. 8 is an enlarged partly cross-sectioned view as seen from the lines VIII—VIII in FIG. 3;

Figure 1:
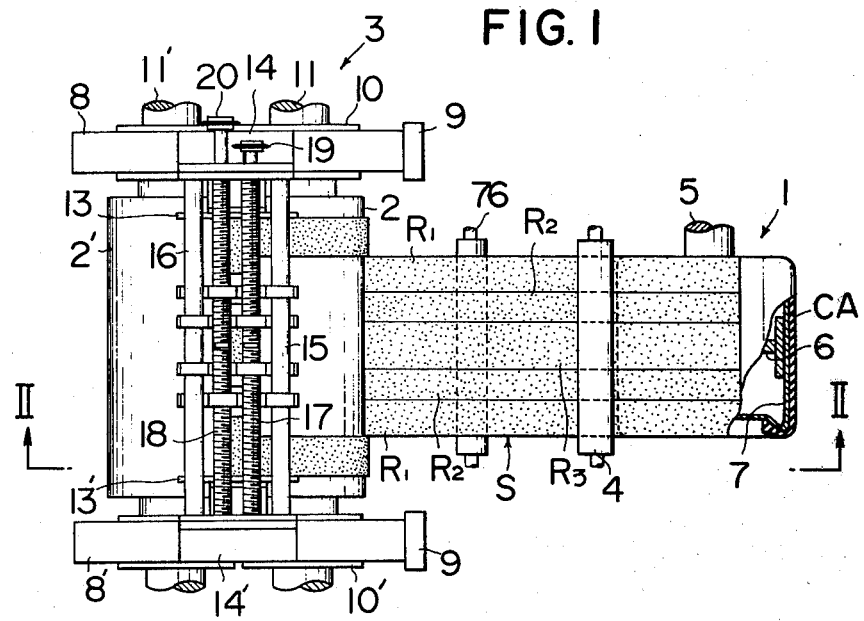
FIG. 1 is a plan view of one embodiment of a pneumatic tire building drum in accordance with the present invention.
Figure 2:
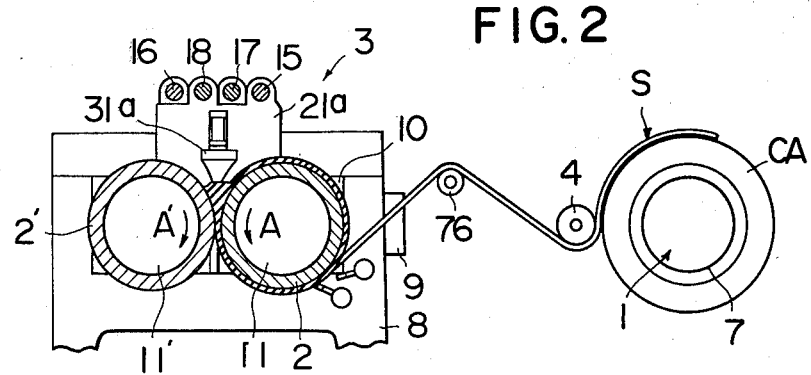
FIG. 2 is a cross-sectional view as seen from the lines II—II in FIG. 1.
Figure 3:
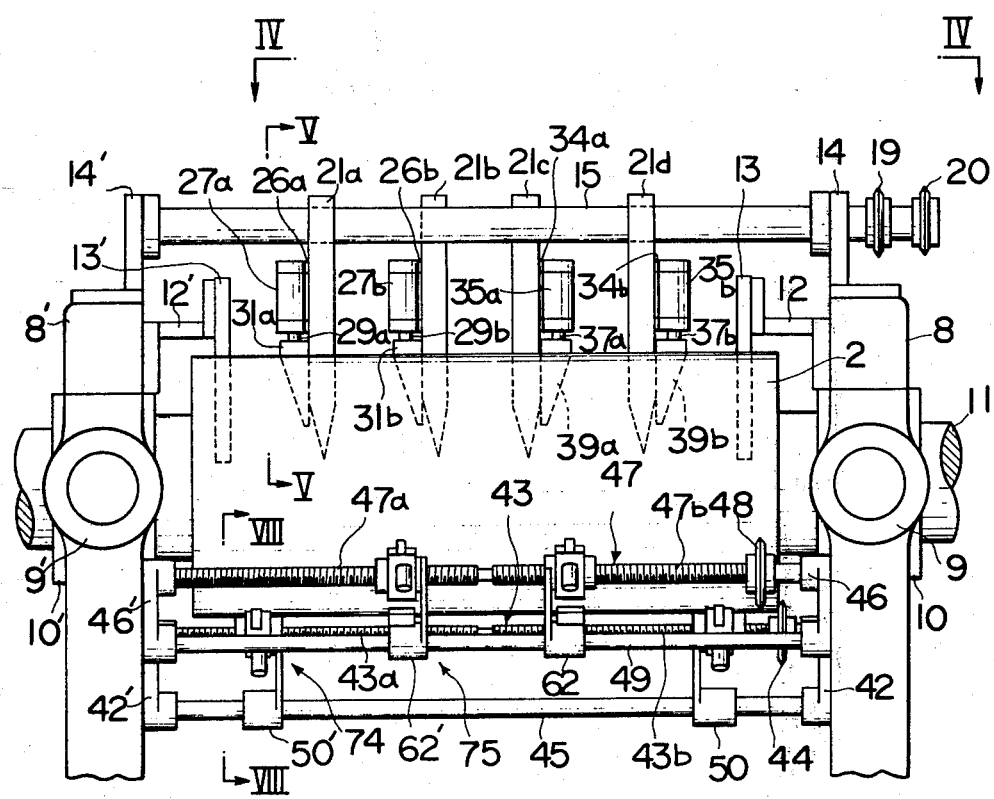
FIG. 3 is an enlarged front elevational view showing a calendering mechanism and a cutting mechanism constituting the apparatus of the present invention.
Figure 4:
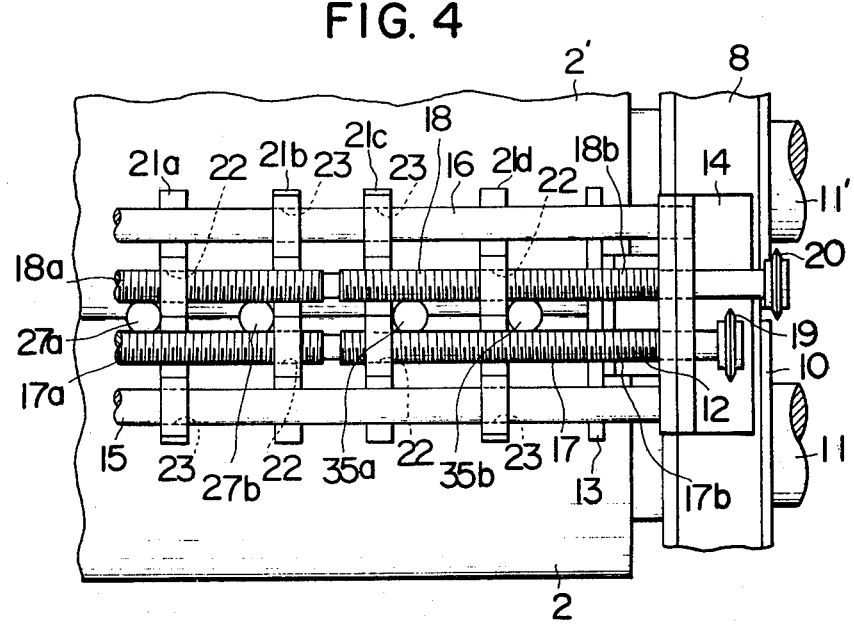
FIG. 4 is a fragmentary plan view as seen from the lines IV—IV in FIG. 3.
Figure 5:
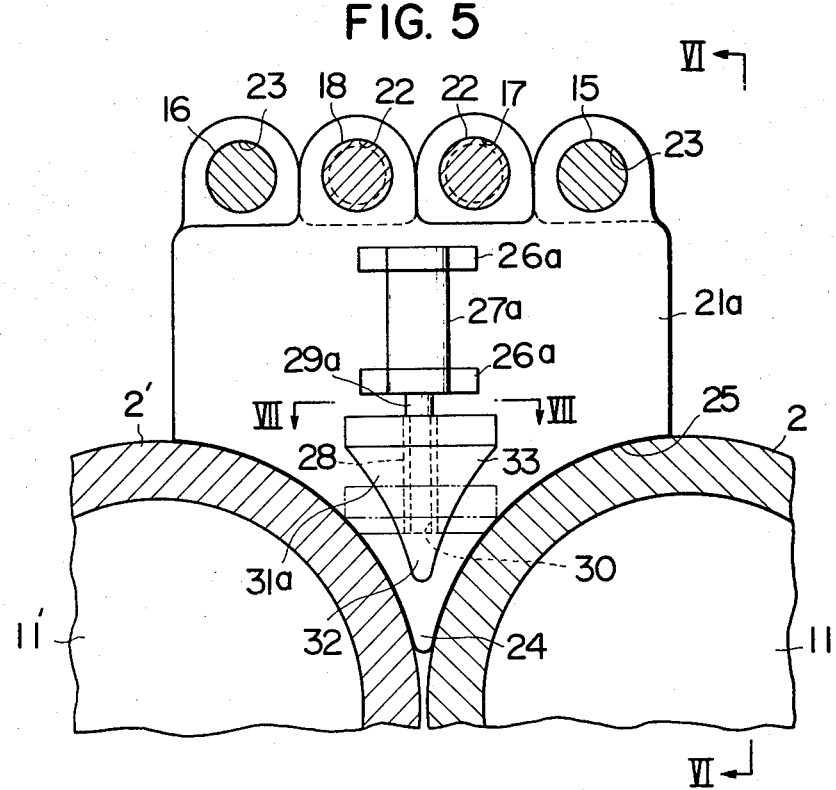
FIG. 5 is an enlarged partly cross-sectioned view as seen from the lines V—V in FIG. 3.

Referring now to the drawings and in particular to FIGS. 1 and 2, there is shown a collapsible tire building drum, generally indicated at 1, which receives and holds an endless tire carcass CA applied in advance thereon. A calendering mechanism, generally denoted at 3, is positioned in spaced relation with the tire building drum 1 and comprises a pair of calender rollers 2 and 2' positioned in opposing and spaced relation with each other and each having a rotational axis parallel to that of the tire building drum 1 so that the calender rollers 2 and 2' cooperatively calender a continuous rubber strip S to be wrapped or applied on the tire carcass CA through a stitcher roller 4 located in opposing and slightly spaced relation with the tire building drum 1. The tire building drum 1 generally comprises a rotary shaft 5 driven for rotation by a driving source, not shown, a plurality of links 6 each of which has one end operably connected with the rotary shaft 5, and a plurality of arcuate segments 7 collectively defining the tire building drum 1 and each of which is operably connected with the other end of the link 6 to be collapsed and expanded. The calendering mechanism 3 further comprises a pair of spaced stationary frames 8 and 8' which rotatably support both ends of a rotary shaft 11' of the calender roller 2' remote from the tire building drum 1. A pair of sliders 10 and 10' are slidably received in slots, formed at the forward half portions of the stationary frames 8 and 8' nearer from the tire building drum 1, to be moved toward and away from the tire building drum 1 and the rotary shaft 11' of the calender roller 2'. The sliders 10 and 10' are respectively connected with screwing means 9 and 9' which are screwed to the forward portions of the stationary frames 8 and 8', respectively, so as to move the sliders 10 and 10' toward and away from the tire building drum 1 and the rotary shaft 11' of the calender roller 2'. On the other hand, the calender roller 2 has a rotary shaft 11 of which both ends are rotatably supported on the sliders 10 and 10' so that the calender roller 2 is movable toward and away from the calender roller 2' by rotations of the screw means 9 and 9'. It is to be noted that the rotations of the rotary shafts 11 and 11' in directions shown by arrows A and A' cause the calender rollers 2 and 2' to be rotated inversely i.e., in the arrow directions A and A' so that a mass of unvulanized rubber material on the calender rollers 2 and 2' is calendered downwardly into a continuous rubber strip S. With reference to FIG. 3, there are shown a pair of brackets 12 and 12' securely mounted on the opposite faces of the stationary frames 8 and 8', respectively, above and between the calender rollers 2 and 2', the brackets 12 and 12' having opposite faces on which are securely and vertically mounted stock guide plates 13 and 13', respectively, to be in perpendicular relation with the rotational axes of the calender rollers 2 and 2'. The stock guide plates 13 and 13' have lower edges contoured in a generally triangular shape and in sliding contact with the calender rollers 2 and 2' so that the mass of unvulcanized rubber material fed onto the calender rollers 2 and 2' is prevented from being axially flown out of the calender rollers 2 and 2'. On the stationary frames 8 and 8' are securely mounted bracket 14 and 14', respectively, which rotatably support a pair of parallel and spaced guide rods 15 and 16 and a pair of parallel and spaced screw rods 17 and 18 positioned between the guide rods 15 and 16, each of the screw rods 17 and 18 being oppositely threaded as at 17a, 17b, 18a and 18b from its central portion to its both ends. The axial portions of the screw rods 17 and 18 projected outwardly from the bracket 14 are respectively adapted to securely mount sprocket wheels 19 and 20 assembled with endless chains, respectively, driven by reversible driving motors, the endless chains and the driving motors being not shown in any drawings. As particularly shown in FIGS. 3 to 6, two pairs of compartment plates 21a, 21b, 21c and 21d are each adapted to have at its upper portion a screw bore 22 and a guide bore 23, the screw bore 22 and the guide bore 23 of the compartment plate 21a being respectively engaged with the threaded portion 18a of the screw rod 18 and the guide rod 15, the screw bore 22 and the guide bore 23 of the compartment plate 21b being respectively engaged with the threaded portion 17a of the screw rod 17 and the guide rod 16, the screw bore 22 and the guide bore 23 of the compartment plate 21c being respectively engaged with the threaded portion 17b of the screw rod 17 and the guide rod 16, while the screw bore 22 and the guide bore 23 of the compartment plate 21d being respectively engaged with the threaded portion 18b of the screw rod 18 and the guide rod 15. It is thus to be understood that the compartment plates 21a, 21b, 21c and 21d are relatively moved toward and away from each other along the guide rods 15 and 16 by rotations of the screw rods 17 and 18. The compartment plates 21a, 21b, 21c and 21d are supported in manner described above by the guide rods 15, 16 and the screw rods 17, 18 to be vertically disposed on and between the calender rollers 2 and 2' in perpendicular relation with the axes of the calender rollers 2 and 2'. Each of the compartment plates 21a, 21b, 21c and 21d extends downwardly to the upper faces of the calender rollers 2 and 2' to have a lower edge 25 arcuately curved correspondingly to the curvatures of the calender rollers 2 and 2' to form an apex 24 at the center of the edge 25 so that the compartment plates 21a, 21b, 21c and 21d are held in sliding contact with the upper faces of the calender rollers 2 and 2' to partition different masses $R_1$, $R_2$ and $R_3$ of unvulcanized rubber material on the calender rollers and to jointly calender the masses into respective calendered rubber materials $R_1$, $R_2$ and $R_3$. On the other hand, the movements of the compartment plates 21a, 21b, 21c and 21d enable the calendered rubber materials $R_1$, $R_2$ and $R_3$ to be increased and decreased in width. On the central and upper faces, opposing to the stationary frame 8', of the compartment plates 21a and 21b are respectively fixedly mounted brackets 26a and 26b which in turn retain vertical cylinders 27a and 27b, respectively, connected to a suitable compressed air source, not shown. A guide member 28 cross-sectioned in a dove-tail shape is attached vertically extending to each of the side faces of the compartment plates 21a and 21b nearer from the stationary frame 8' and below the vertical cylinders 27a and 27b as particularly shown in FIGS. 5 to 7. To the leading ends of piston rods 29a and 29b of the cylinders 27a and 27b are respectively attached separators 31a and 31b which have respective side faces opposing to the compartment plates 21a and 21b and formed with vertically extending grooves 30 cross-sectioned in a dove-tail shape. The separators 31a and 31b are respectively in engagement with the compartment plates 21a and 21b with the grooves 30 slidably receiving the guide members 28 so as to be vertically moved by the action of the cylinders 27a and 27b, respectively. each of the separators 31a and 31b has a lower edge 33 arcuately curved correspondingly to the curvatures of the calender rollers 2 and 2' to form an apex 32 at the center of the edge 33 so that the separators 31a and 31b are slidingly contactable with the upper faces of the calender rollers 2 and 2' to partition different masses $R_1$, $R_2$ and $R_3$ of unvulcanized rubber material on the calender rollers 2 and 2' and to be capable of separately calendering the masses into respectively calendered rubber materials $R_1$, $R_2$ and $R_3$. On the central and upper faces, opposing to the stationary frame 8, of the compartment plates 21c and 21d are respectively fixedly mounted brackets 34a and 34b which in turn retain vertical cylinders 35a and 35b respectively connected to a suitable compressed air source, not shown. A guide member 36 cross-sectioned in a dove-tail shape is attached vertically extending to each of the side faces of the compartment plates 21c and 21d nearer from the stationary frame 8 and below the vertical cylinders 35a and 35b. To leading ends of piston rods 37a and 37b of the cylinders 35a and 35b are respectively attached separators 39a and 39b which have respective side faces opposing to the compartment plates 21c and 21d and formed with vertically extending grooves 38 cross-sectioned in a dove-tail shape. The separators 39a and 39b are respectively in engagement with the compartment plates 21c and 21d with the grooves 38 slidably receiving the guide members 36 so as to be vertically moved by the action of the cylinders 35a and 35b, respectively. Each of the separators 39a and 39b has a lower edge 40 arcuately curved correspondingly to the curvatures of the calender rollers 2 and 2' to form an apex at the center of the edge 40 so that the separators 39a and 39b are slidingly contactable with the upper faces of the calender rollers 2 and 2' to partition different masses $R_1$, $R_2$ and $R_3$ of unvulcanized rubber material on the calender rollers 2 and 2' and to be capable of separately calendering the masses into respectively calendered rubber materials $R_1$, $R_2$ and $R_3$.

Figure 9:
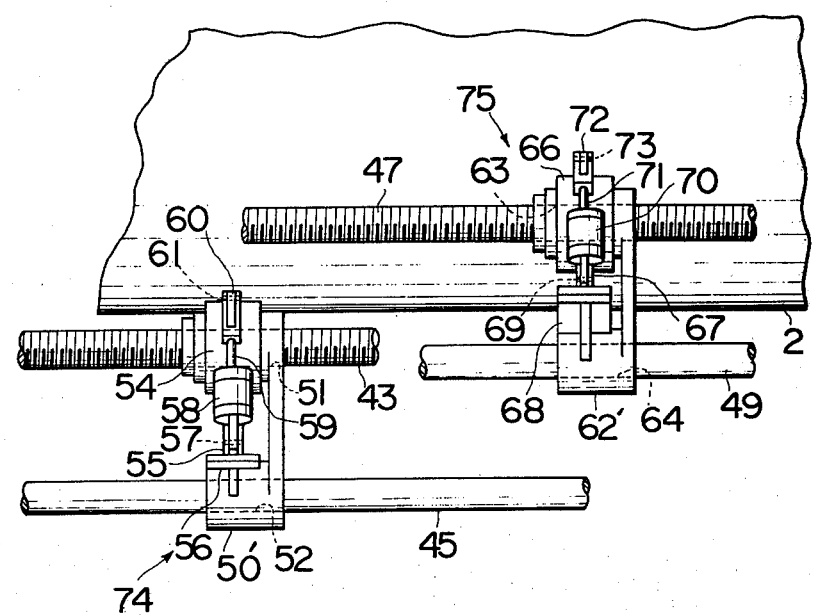
FIG. 9 is an enlarged fragmentary view as seen from the lines VIIII—VIIII in FIG. 8.

As best shown in FIGS. 3, 8 and 9 a pair of brackets 42 and 42' are securely mounted on the opposite faces of the stationary frames 8 and 8' forwardly of the calender rollers 2 and 2'. A screw rod 43 is rotatably mounted at its both ends on the upper portions of the brackets 42 and 42' and is oppositely threaded as at 43a and 43b from its central portion to its both ends. On one end of the screw rod 43 is securely mounted a sprocket wheel 44 which is assembled with an endless chain driven by a driving mechanism, the endless chain and the driving mechanism being not shown in any drawings. A guide rod 45 is fixedly mounted at its both ends on the lower ends of the brackets 42 and 42' in parallel relation with the screw rod 43.

A pair of brackets 46 and 46' are securely mounted on the opposite faces of the stationary frames 8 and 8' forwardly of the screw rod 43. A screw rod 47 is rotatably mounted at its both ends on the upper portions of the brackets 46 and 46' and is oppositely threaded as at 47a and 47b from its central portion to its both ends. On one end of the screw rod 47 is securely mounted a sprocket wheel 48 which is assembled with an endless chain driven by a driving mechanism, the endless chain and the driving mechanism being not shown in any drawings. A guide rod 49 is fixedly mounted at its both ends on the lower ends of the brackets 46 and 46' in parallel relation with the screw rod 47. A pair of movable members 50 and 50' are retained by the screw rod 43 and the guide rod 45 in such a way that screw bores 51 are respectively formed in the upper portions of the movable members 50 and 50' to be in threaded engagement with the threaded portions 43a and 43b of the screw rod 43 while cylindrical bores 52 are respectively formed in the lower portions of the movable members 50 and 50' to be in sliding engagement with the guide rod 45. A rockable arm 54 is swingably retained at its one end on the upper portion of each of the movable members 50 and 50' and has a cutter 53 on the other free end thereof facing to the calender roller 2. On the lower end of each of the movable members 50 and 50' are securely mounted a stand 56 on which is also securely mounted a bracket 55 pivotally connected through a pivotal pin 57 with the lower end of a cylinder 58 connected with a suitable compressed air source, not shown. The cylinder 58 has a piston rod 59 the leading end of which is pivotally connected through a pivotal pin 61 with a bracket 60 securely attached to the one end of the rockable arm 54 so that when the cylinder 58 is actuated to cause the piston rod 59 to be retracted or projected, the forward edge of the cutter 53 comes to be engaged with or disengaged from the outer peripheral surface of the calender roller 2. The rubber strip S of the jointingly calendered rubber materials $R_1$, $R_2$ and $R_3$ is therefore severed into a desired width when the cutter 53 is being engaged with the outer peripheral surface of the calender roller 2. The rotation of the screw rod 43 enables the movable members 50 and 50' to be moved toward and away from each other under the guidance of the guide rod 45 along the rotational axes of the calender rollers 2 and 2', i.e., in a width direction of the rubber strip S so that the width of the rubber strip S is preferably varies. A pair of movable members 62 and 62' are retained by the screw rod 47 and the guide rod 49 in such a way that screw bores 63 are respectively formed in the upper portions of the movable members 62 and 62' to be in threaded engagement with the threaded portions 47a and 47b of the screw rod 47 while cylindrical bores 64 are respectively formed in the lower portions of the movable members 62 and 62' to be in sliding engagement with the guide rod 49. A rockable arm 66 is swingably retained at its one end on the upper portion of each of the movable members 62 and 62' and has a cutter 65 on the other free end thereof facing to the calender roller 2. On the lower end of each of the movable members 62 and 62' are securely mounted a stand 68 on which is also securely mounted a bracket 67 pivotally connected through a pivotal pin 69 with the lower end of a cylinder 70 connected with a suitable compressed air source, not shown. The cylinder 70 has a piston rod 71 the leading end of which is pivotally connected through a pivotal pin 73 with a bracket 72 securely attached to the one end of the rockable arm 66 so that when the cylinder 70 is actuated to cause the piston rod 71 to be retracted or projected, the forward edge of the cutter 65 comes to be engaged with or disengaged from the cutter peripheral surface of the calender roller 2. The rubber strip S of the jointingly calendered rubber materials $R_1$, $R_2$ and $R_3$ is therefore severed into a desired width when the cutter 65 is being engaged with the outer peripheral surface of the calender roller 2. The rotation of the screw rod 47 enables the movable members 62 and 62' to be moved toward and away from each other under the guidance of the guide rod 49 along the rotational axes of the calender rollers 2 and 2', i.e., in a width direction of the rubber strip S so that the width of the rubber strip S is preferably varies. The foregoing brackets 42, 42', screw rod 43, sprocket wheel 44, guide rod 45, movable members 50, 50', cutters 53, rockable arm 54, and cylinder 58 constitute as a whole a first cutting mechanism, generally indicated at 74. The foregoing brackets 46, 46', screw rod 47, sprocket wheel 48, guide rod 49, movable members 62, 62', cutters 65, rockable arm 66, and cylinder 70 constitute as a whole a first cutting mechanism, generally indicated at 75. According to the present invention, the first or second cutting mechanism may be provided to cut the rubber strip S to have a desired width.

Referring back to FIGS. 1 and 2, the reference numeral 76 designates a guide roller provided rotatably between the stationary frames 8, 8' and the tire building drum 1 to guide the rubber strip S, cut by the first and second cutting mechanisms 74 and 75, to the tire building drum 1 where the rubber strip S is applied by the stitcher roller 4 onto the tire carcass CA which is in advance wrapped or applied around the tire building drum 1.

The operation of the apparatus thus constructed above will be described hereinafter.

Figure 10:
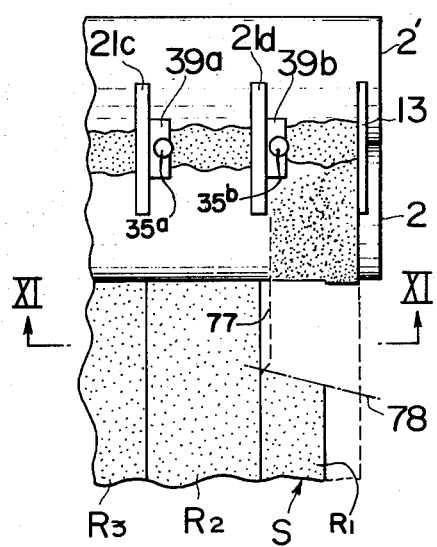
FIG. 10 is a fragmentary plan view especially illustrating a continuous rubber strip consisting of rubber materials.
Figure 11:
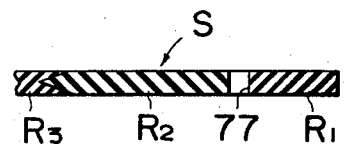
FIG. 11 is a fragmentary cross-sectional view as seen from the line XI—XI in FIG. 10.
Figure 12:
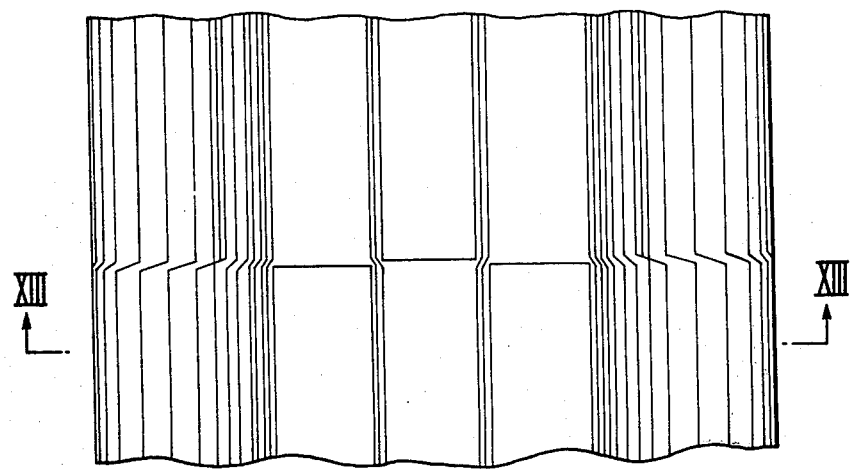
FIG. 12 is a fragmentary view showing a contour of a pneumatic tire built by the apparatus of the present invention, the contour including initial and final rubber strip applied points.
Figure 13:
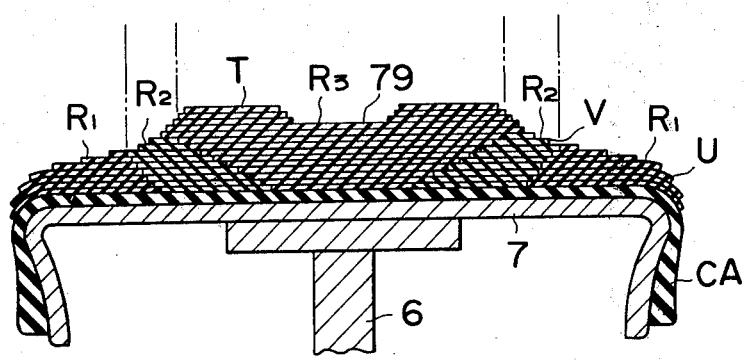
FIG. 13 is a fragmentary cross-sectional view as seen from the lines XIII—XIII in FIG. 12.

At the preliminary stage, the compartment plates 21a, 21b, 21c and 21d are set at their respective desired positions along the screw rods 17, 18 and the guide rods 15, 16 while the piston rods 29a, 29b, 37a and 37b of the cylinders 27a, 27b, 35a and 35b are held at their respective retracted positions so that the separators 31a, 31b, 39a and 39b are retained at positions of their respective solid lines as shown in FIG. 6. The piston rods 59 and 71 of the cylinders 38 and 70 are also at this stage held projected to space the cutters 53 and 65 apart from the outer peripheral surface of the calender roller 2 as shown in solid lines in FIG. 8. Also at this stage, the tire carcass CA are wrapped and applied on the tire building drum 1 as shown in FIGS. 1 and 2. Following the above stage, the sliders 10 and 10' are moved by the screwing means 9 and 9' respectively, so as to adjust the gap between the calender rollers 2 and 2' so that the desired thickness of the rubber strip S may be calendered. The rotary shafts 11 and 11' are respectively rotated in the directions shown by the arrows A and A' for inversely rotating the calender rollers 2 and 2' while the tire building drum 1 is rotated in a clockwise direction in FIG. 2. By a suitable rubber material feeding mechanism not shown, a rubber material $R_1$ to be built into side rubber portions U is then fed on and between the calender rollers 2 and 2' between the stock guide plate 13' and the compartment plate 21a and between the compartment plate 21d and the stock guide plate 13. Simultaneously with the feeding of the rubber material $R_1$, another rubber material $R_2$, which has different compositions from those of the rubber material $R_1$ to be built into an intermediate rubber portion V, is fed on and between the calender rollers 2 and 2' between the compartment plates 21a and 21b and between the compartment plates 21c and 21d while the remaining rubber material $R_3$, which has different compositions from those of the rubber materials $R_1$ and $R_2$ to be built into a tread rubber portion T, is fed on and between the calender rollers 2 and 2' between the compartment plates 21b and 21c. The rubber materials $R_1$, $R_2$ and $R_3$ are thus calendered into a continuous rubber strip S by the calender rollers 2 and 2' since the rollers 2 and 2' are being inversely rotated as shown in FIG. 2. At this time, the rubber materials $R_1$, $R_2$ and $R_3$ joins together at the apexes 24 of the compartment plates 21a, 21b, 21c and 21d to be jointed meshingly with each other as shown in FIG. 11 since the rubber materials $R_1$, $R_2$ and $R_3$ are of adhesive characteristic. The screw rod 43 is then rotated to move the movable members 50 and 50' their respective desired positions along the guide rod 45 while the piston rods 59 are retracted by the action of the cylinders 58 to engage the cutters 53 with the outer peripheral surface of the roller 2 as shown in phantom lines in FIG. 8. The jointed rubber strip S is timingly cut at its both ends into a predetermined width by means of the cutters 53. The central rubber strip S to be used is transferred to the tire building drum 1 through the guide roller 76 while the side trimmed rubber strips S not to be used are fed on and between the calender rollers 2 and 2' after being wrapped around the calender roller 2. The rubber strip S thus transferred to the tire building drum 1 through the guide roller 76 is wrapped around and applied on the tire cacass CA, previously applied on the tire building drum 1, in cooperation with the stitcher roller 4. When the initial rubber strip S has thus been applied on the tire carcass CA, the screw rod 43 is rotated to cause the movable members 50 and 50' in unison with the cutters 53 to be moved to their respective positions. Simultaneously with the rotation of the screw rod 43, the screw rod 17 is rotated to cause the compartment plates 21b and 21c to be moved away from each other along the guide rod 16 to their respective positions while the screw rod 18 is rotated to cause the compartment plates 21a and 21d to be moved away from each other along the guide rod 15 to their respective positions so that the widths of the rubber materials $R_1$, $R_2$ and $R_3$ occupying the rubber strip S may be varied. The width adjustment of the compartments 21a, 21b, 21c and 21d makes narrower the widths of the rubber materials $R_1$ and $R_2$ occupying the rubber strip S and makes broader the width of the rubber material $R_3$ occupying the rubber strip S as shown in FIG. 13. As the movements of the compartment plates 21a, 21b, 21c and 21d require a certain period of time, the rubber strip S is progressively reduced in width with a certain inclination angle as shown in FIG. 12. Several plies of rubber strip S consisting of the rubber materials $R_1$, $R_2$ and $R_3$ are wrapped around the carcass CA on the tire building drum 1 with the widths progressively varied of the rubber strip S in a similar manner to build the tread rubber T, the side rubber portions U in a predetermined contour. For example, when the rubber materials $R_1$ to be removed from the rubber strip S are calendered, the cylinders 27a and 35b are actuated to cause the piston rods 29a and 37b to be projected so that the separators 31a and 39b are downwardly moved along the guide members 28 and 36 to assume their lowest positions shown in phantom lines in FIG. 5 where the lower edges 32, 40 are slidingly contacted with the upper faces of the calendered rollers 2 and 2'. The rubber materials $R_1$ are therefore prevented from flowing into positions between the separators 31a and the compartment plate 21a and between the separator 39b and the compartment plate 21d, thereby causing slits 77 to be generated from and after positions of the rubber strip S as shown in FIG. 10 and 11 where the rubber materials $R_1$ are finally jointed with the rubber material $R_2$. The rubber materials $R_1$ are thus calendered separately from the rubber material $R_2$ and then cut at leading end positions of slits 77 along the lines 78, only one line and only one slit being shown in FIG. 10, by means of the cutters 53 on the movable members 50 and 50'. The cut rubber materials $R_1$ are then transferred by a suitable not shown conveyor or fed back onto and between the calender rollers 2 and 2'. The rubber strip S of the rubber materials $R_2$ and $R_3$ are consecutively applied onto the rubber strip S just applied to progressively form a desired contour of the tread rubber portion T. When such an applying operation proceeds until the rubber materials $R_2$ to be removed from the rubber strip S are calendered, the cylinders 27b and 35a are similarly actuated to cause the piston rods 29b and 37a to be projected so that the separators 31b and 39b are downwardly moved to assure their respective positions as shown in phantom lines in FIGS. 5 and 6. In a similar manner, slits are created from and after positions where the rubber materials $R_2$ are finally jointed with the rubber material $R_3$ so that the rubber materials $R_2$ are thus calendered separately from the rubber material $R_3$ to be removed. In order to form an annular recess 79 on the tread rubber portion T as shown in FIG. 13, the screw rod 47 is rotated to cause the movable members 62 and 62' to be moved along the guide rod 49 to their respective desired positions, while the cylinders 70 are actuated to cause the piston rods 71 to be retracted so that the cutters 65 are brought into engagement with the calender roller 2 as shown in phantom line in FIG. 8. The rubber strip S is thus formed at its central portion with a pair of cut faces extending along its longitudinal direction. The rubber strip s is then cut at its central portion connecting the leading ends of the cut faces by a suitable cutter to feed a useless cut portion of the rubber material $R_3$ back onto and between the calender rollers 2 and 2'. The rubber strip S is separated into two pieces which are consecutively wrapped around the rubber strip S just applied while being progressively decreased in width. When a predetermined configuration of the tread portion T is formed, the rubber strip S is cut in its width direction for completion of application of the tread rubber portion T. As mentioned above, a pneumatic tire including the tread rubber portion T consisting of different compositions and the side rubber portion U consisting of differrent compositions can be produced. According to the present invention, any one of the tread rubber portion T and the side rubber portion U which consists of different compositions may, of course, be produced. After production of the pneumatic tire, the tire building drum 1 and the calender rollers 2 and 2' are stopped. The calender roller 2 is then moved apart from the calender roller 2' so as to collect the residual rubber materials $R_1$, $R_2$ and $R_3$ by a suitable collecting device. The cylinders 38 and 70 are then actuated to cause the piston rods 59 and 71 to be projected as shown in solid lines in FIG. 8 so that the cutters 53 and 65 are disengaged from the calender roller 2, while the cylinders 27a, 27b, 35a and 35b are actuated to cause the piston rods 29a, 29b, 37a and 37b to be retracted so that the separators 31a, 31b, 39a and 39b resumes their respective initial positions as shown in FIG. 3. Further, the screw rods 17, 18 and the screw rods 43, 47 are rotated to cause the compartment plates 21a, 21b, 21c, 21d and the movable members 50, 50', 62, 62' to be moved to their respective initial positions.

The foregoing description is one cycle of the operation of the pneumatic tire building apparatus according to the present invention which cycles are repeated to produce a number of pneumatic tires.

While it has been described in the above embodiment that four compartment plates 21a, 21b, 21c and 21d are employed, only one compartment plate may be employed according to the present invention. In the above embodiment, the separators 31a, 31b, 39a and 39b are securely connected to the leading end of the piston rods 29a, 29b, 37a and 37b to be vertically movable for the purpose of separating the rubber materials to be removed out of the continuous rubber strip, however, any separator may be employed to separate and joint the rubber materials if the separator is relatively movably mounted on said compartment plate and having a lower edge contoured in sliding contact with the calender rollers. In order to move the compartment plates 21a, 21b, 21c and 21d, the above embodiment employs a pair of screw rods 17 and 18 oppositely threaded from their central portions to their longitudinal ends, but any means may be used to freely vary the widths of the calendered rubber materials if it can move the compartment plate or plates in the present invention. While the cylinders 27a, 27b, 35a, 35b and the separators 31a, 31b, 39a, 39b are provided on one side face of each of the compartment plates 21a, 21b, 21c and 21d in the above embodiment, such cylinders and separators may be provided on both side faces of each of the compartment plates 21a, 21b, 21c and 21d in accordance with the present invention if desired. In the above embodiment, the screw rods 43, 47, the movable members 50, 50', 62, 62', the lockable arms 54, 66, the cylinders 58, 70 and the cutters 53, 65 are used as a cutting mechanism, however, any cutting mechanism may be employed if the mechanism is disposed between the tire building drum 1 and the calendering mechanism 3 to be movable along the rotational axes of the calender rollers 2 and 2' for cutting the calendered rubber materials $R_1$, $R_2$ and $R_3$ to have desired widths according to the present invention. Where it has been described in the above embodiment that a pneumatic tire is built to have the tread rubber portion T, the intermediate rubber portions V and the side rubber portions U all exposed to the outer peripheral surface thereof, a pneumatic tire, for example, may be built to have the intermediate rubber portions V not exposed to the outer peripheral surface thereof by covering the rubber portions V with the thread portion T and the side rubber portions U adjacent thereto. In this case, the compartment plates 21b and 21c are each required to be vertically divided into two pieces movably connected by a suitable screw rod wherein a required amount of rubber materials $R_2$ is fed into each of the gaps between the compartment plates 21a and 21b and between the compartment plates 21c and 21d to be calendered by the calender rollers 2 and 2', and immediately after calendering of the rubber materials $R_2$ the screw rods are rotated to lift the lower pieces of the compartment plates 21b and 21c to calender the rubber material $R_3$ from the gap between the compartment plates 21a and 21d successively after the rubber materials $R_2$.

According to the present invention as mentioned above, a pneumatic tire can be produced in a short period of time without any gap between the rubber strips which caused in the conventional manners. The operation for production of the penumatic tire is very simple and the apparatus of the present invention can be produced inexpensively. Further, the calendered materials not to be used can be collected without being blended for saving thereto.

Although particular embodiments of the present invention have been shown and described, it will be obvious to those skilled in the art that various changes and modifications may be made without departing from the spirit and scope of the present invention.

What is claimed is:

1. A pneumatic tire building apparatus comprising:
a tire building drum receiving and holding an endless tire carcass;
a calendering mechanism positioned in spaced relation with said tire building drum, said calendering mechanism including a pair of calender rollers positioned in opposing and spaced relation with each other and each having a rotational axis parallel to that of said tire building drum; at least one compartment plate vertically disposed on and between said calender rollers in perpendicular relation with said rotational axes of said calender rollers and having a lower edge contoured in sliding contact with said calender rollers to partition different unvulcanized rubber materials on said calender rollers and to enable a continuous rubber strip consisting of said different rubber materials to be calendered by said calender rollers, said compartment plate movable along said rotational axes of said calender rollers to vary desired widths of said calendered rubber materials, at least one separator relatively movably mounted on said compartment plate and having a lower edge contoured in sliding contact with said calender rollers to separate and joint said calendered rubber materials, driving means drivably connected with said calender rollers for rotation therefor, compartment moving means for moving said compartment plate along said rotational axes of said calender rollers, and separator moving means for moving said separator to separate and joint said calendered rubber materials; and
a cutting mechanism disposed between said tire building drum and said calendering mechanism to be movable along said rotational axes of said calender rollers for cutting said calendered rubber materials to have their desired widths.

2. A pneumatic tire building apparatus as set forth in claim 1, in which said separator of said calendering mechanism is vertically movably engaged with said compartment plate to separate and joint calendered rubber materials upon lowerest and uppermost movements, respectively, of said separator, and in which said separator moving means includes a cylinder attached to the side face of said compartment plate and having a piston rod connected to said separator to vertically move said separator to its lowest and uppermost positions.

3. A method of applying two or more different kinds of rubber materials onto a tire carcass located on a tire building drum, from a calendered sheet consisting of at least two different kinds of rubber materials by convolutely winding said calendered sheet on successive layers on the carcass to develop a desired tread and sidewall profile and disposition of said two or more different kinds of rubber materials thereon, comprising the steps of:

(a) stationing a pair of counterrotatable calender rollers positioned in opposing and spaced relation with each other in the vicinity of the tire building drum with the rotational axis of each parallel to that of said tire building drum, and gapping the calender rollers a desired distance apart for producing a calendered sheet of a desired thickness;

(b) providing the calender rollers on their upstream side with respective supplies of each of at least two different kinds of rubber materials;

(c) stationing compartment width limiters at initial positions relative to said respective supplies and said calender rollers, so that each respective supply is provided to a respective compartment with the compartment limiters determining the location and relative width of each kind of rubber material being calendered;

(d) by counterrotating said calender rollers and providing a desired number of said respective supplies thereto and thus beginning production of a unitary rubber strip for advancing toward the tire building drum;

(e) engaging the unitary rubber strip with at least one cutter in the vicinity of at least one respective lateral margin of the unitary rubber strip, for severing a respective flanking portion from a remaining main portion of said unitary rubber strip, said remaining portion being composed of at least two different kinds of rubber materials united along an internal marginal line running longitudinally of said remaining main portion, this internal marginal line demarkating one kind of rubber material which passed on one side of one of said compartment width limiters from another kind of rubber material which passed on the opposite side of that same compartment width limiter;

(f) proximate said demarkating internal marginal line correlated with said one compartment width limiter, interposing a separator at least substantially through said remaining main portion of the unitary rubber strip, and thus creating a longitudinally extending slot through said remaining main portion, which has on one side of it, in an auxiliary band, substantially all of said one kind of rubber material which had passed said one side of said one compartment width limiter, a correspondingly-diminished remaining main portion thus being on the other side of said slot;

(g) moving a cutter in engagement with said remaining main portion of said unitary rubber strip,
  (i) from the edge of said remaining main portion that was created when said respective flanking portion was severed from said remaining main portion by said at least one cutter,
  (ii) to the slot being formed by said separator proximate the angularly most downstream end of the slot,
so that said auxiliary band, at a downstream end thereof thereby created, is also transversally severed from said correspondingly diminished remaining main portion of said unitary rubber strip;

(h) recycling for continued calendering each said flanking portion to upstream of said calender rollers to a respective said compartment for the kind of rubber material constituting the respective flanking portion;

(i) recycling for continued calendering said one kind of rubber material of said auxiliary band, by leading said downstream end of said auxiliary band back upstream of said calender rollers to a respective compartment for said one kind of rubber material;

(j) leading said correspondingly diminished main portion of said unitary rubber strip to and wrapping said unitary rubber strip convolutely about said tire carcass on said tire building drum in a plurality of superimposed circumferentially extending wraps, while (k) progressively varying the dispositions of said compartment width limiters, said separator and at least one said cutter widthwise of and, in the case of said separator, thicknesswise into and out of said unitary rubber strip in order to respectively progressively vary the relative width and position of each said kind of rubber material in said unitary rubber strip reamining main portion to progressively vary the total width of said unitary rubber strip remaining main portion relative to that of the as-calendered unitary rubber strip, and to progressively vary the absolute width of said correspondingly diminished remaining main portion of said unitary rubber strip, so that as succeeding wraps are made some are of greater width than others and some have relatively different portions of their entire widths constituted by at least one said kind of rubber material.

* * * * *